United States Patent
Tanomura et al.

[15] 3,664,979
[45] May 23, 1972

[54] POLYURETHANE ELASTOMER AND METHOD FOR PREPARATION OF SAME

[72] Inventors: Masahisa Tanomura; Kazuo Itoi, both of Kurashiki, Japan

[73] Assignee: Kuraray Co., Ltd., Kurashiki, Japan

[22] Filed: Dec. 15, 1969

[21] Appl. No.: 885,281

[30] Foreign Application Priority Data

Dec. 16, 1968  Japan..................................43/92525
Dec. 19, 1968  Japan..................................43/93598
Mar. 15, 1969  Japan..................................44/19748

[52] U.S. Cl..........................260/75 NK, 117/63, 117/135.5, 161/190, 260/2.5 AY
[51] Int. Cl. .................................C08g 22/10, C08g 53/08
[58] Field of Search..............260/2.5 AY, 77.5 SP, 77.5 AM; 117/63, 135.5

[56] References Cited

UNITED STATES PATENTS

| | | | |
|---|---|---|---|
| 2,741,800 | 4/1956 | Brockway | 18/58 |
| 2,998,403 | 8/1961 | Mueller et al. | 260/45.4 |
| 3,000,757 | 9/1961 | Johnston et al. | 117/63 |
| 3,100,721 | 8/1963 | Holden | 117/135.5 |
| 3,192,185 | 6/1965 | Achterhof et al. | 260/75 |
| 3,481,765 | 12/1969 | Nakajo et al. | 117/63 |
| 3,496,144 | 2/1970 | Kunde et al. | 260/75 |

OTHER PUBLICATIONS

Vieweg/Hoechtlen – Polyurethane, Carl Hanser, Muenchen (1966) Pages 14 and 739

*Primary Examiner*—Donald E. Czaja
*Assistant Examiner*—H. S. Cockeram
*Attorney*—Stepno and Neilan

[57] ABSTRACT

Polyurethane elastomers having excellent resistance to hydrolysis and which are readily wet coagulated are prepared via the reaction of polymeric diols having molecular weights of about 800 to about 5,000, organic diisocyanates and chain extenders selected from the group consisting of aliphatic diols having two to four carbon atoms.

Said polymeric diols are polyester diols which are the reaction products of aliphatic dicarboxylic acids and mixed diols consisting of from 20 to 80 mol per cent of 2-ethyl hexane-1,3-diol and from 80 to 20 mol per cent of a diol selected from the group consisting of diethylene glycol, ethylene glycol, propylene glycol and butylene glycol; or a mixture of said polyester diol and at most 50 weight per cent based on the mixture of polyalkylene ether glycols, such as polypropylene glycol or polytetramethylene glycol.

12 Claims, No Drawings

POLYURETHANE ELASTOMER AND METHOD FOR PREPARATION OF SAME

BACKGROUND OF THE INVENTION

1 Field of the Invention

This invention relates to novel polyurethane elastomers which are highly resistant to hydrolysis and which are very readily wet coagulated, and to the preparation of the same.

It is well known that polyurethane elastomers are produced by the reaction among polymeric diols having a molecular weight of about 500 to 10,000 and having hydroxyl groups at both chain terminals, such as polyester diols or polyalkylene ether diols, organic diisocyanates and a chain extender, such as the aliphatic diols, aliphatic diamines and hydrazine.

2 Description of the Prior Art

It is also well known that films or sheets useful as leather substitutes, or the so-called artificial leathers are made from polyurethane elastomeric solutions or emulsions by the wet coagulation method, which is characterized in that polyurethane elastomeric solutions or emulsions are impregnated into fabrics, such as woven cloths or nonwoven fabrics, or coated onto the surfaces of base sheets, or extruded from a slit, and then dipped into a miscible nonsolvent for said elastomers, such as water, lower alcohols or a mixture of such nonsolvents and the solvent of said elastomer to coagulate the impregnated, or coated, or extruded elastomers. These methods are described in, for example, U.S. Pat. Nos. 3,067,482, 3,100,721, 3,190,765 and 3,284,274.

Among the polyurethane elastomers, those produced by the reaction of polyalkylene ether glycol, such as polypropylene glycol or polytetramethylene ether glycol, as the polymeric diol, organic diisocyanates and aliphatic diamines, such as ethylene diamine or hydrazine, as the chain extender are mainly used for the production of films or sheets in the above noted patents.

According to investigations of the present inventors, it was observed that the polyurethane elastomers of the above patents were more difficulty processed into films or sheets having smooth surfaces and a homogeneous microporous structure than those comprising the reaction products of polyester diols, organic diisocyanates and aliphatic diols, because of their poor coagulating properties.

On the other hand, polyurethane elastomers produced via the reaction among polyester glycols, such as polyethylene-propylene adipate or polybutylene adipate, as the polymeric diol, organic diisocyanates and aliphatic diols such as ethylene glycol or butane diol-1,4 as the chain extender display a good coagulating property by the wet coagulating method described in the above patents. Therefore, use of these polyurethane elastomers in the production of films or sheets useful as leather substitutes is also disclosed in U.S. Pat. No. 3,348,963.

But these polyurethane elastomers produced via the reaction of polyester diols, aliphatic diols and organic diisocyanates are readily hydrolyzed with water or water vapor, especially with aqueous solutions of acids or bases. And degradation of the elastomeric molecules often occurred. Shoes or boots made of said leather substitutes have a poor resistance to sweat, which contains weak acids, such as lactic acid, or weak alkali, such as ammonium hydroxide. Therefore many cracks occur on the surfaces of said shoes or boots and their mechanical properties decline over periods of use.

In order to improve resistance to hydrolysis of the elastomer, many improvements has been suggested. One is described in the specification of British Pat. No. 975,303, wherein it is proposed to employ a mixture of hexane diol-1,6 and butane-2,3-diol or 2,2-dimethyl-propane-1,3-diol (neopentyl glycol) as the diol component to make a polyester diol with adipic acid.

But the elastomers produced by the reaction of poly hexane-1,6-butane-2,3-adipate or poly hexane-1,6-2,2-dimethyl propane-1,3 adipate as the polyester diol, 4,4'-diphenyl methane diisocyanate and ethylene glycol (the chain extender) are inferior to polyurethane elastomers produced from polyethylene propylene adipate because its wet coagulation in water or an aqueous solution of said elastomeric solvent is deficient, and it is difficult to produce a film or a sheet therefrom having smooth surfaces and a homogeneous microporous structure by the ordinary wet coagulation method.

SUMMARY OF THE INVENTION

Therefore, a primary object of the present invention is the provision of polyurethane elastomers having both improved resistance to hydrolysis and an improved wet coagulating property.

Another object of the present invention is the provision of a method for producing such improved polyurethane elastomers.

Yet another object of the invention is the provision of, from the novel polyurethane elastomers, films or sheets having microporous structures and having a gas or vapor permeability and water or liquid impermeability, such as to be useful as leather substitutes.

The polyurethane elastomers of the present invention comprise the reaction products of the hereinafter defined polyester diols, an organic diisocyanate and a chain extender which is selected from the group consisting of aliphatic diols having from two to four carbon atoms, e.g., ethylene glycol, propylene glycol and butylene glycol (butane-diol-1,4, or 1,3).

The polyurethane elastomers of the present invention can be prepared in any suitable manner such as by reacting an organic diisocyanate with the polyester glycol to make a prepolymer and then reacting said prepolymer with a monomeric diol, i.e., via a "prepolymer process," or by simultaneously reacting the polyester glycol, the organic diisocyanate and the aliphatic diol, i.e., via a "one shot process." The polymerization processes can be conducted in solution employing a solvent for both the ingredients and the final product, e.g., dimethylformamide, dimethylacetamide, diethylformamide, diethylacetamide, tetrahydrofuran or dimethylsulfoxide (i.e., via solution polymerization).

The polymerization can also be effected according to the process described in the U.S. Pat. No. 3,310,533 resulting in a polymer powdery form or by means of a melt polymerization under a sufficiently high temperature to melt both the ingredients and the product.

DESCRIPTION OF THE PREFERRED EMBODIMENTS

Polyester diols used to prepare the polyurethane elastomers of the invention are the reaction products of an aliphatic dicarboxylic acid, such as glutaric acid, adipic acid, pimelic acid, suberic acid, azelaic acid, sebasic acid and especially adipic acid with a mixture of glycols comprised of from 20 to 80 mol per cent, preferably from 30 to 70 mol per cent, of 2-ethyl hexane diol-1,3 and the balance a glycol selected from the group consisting of ethylene glycol, propylene glycol, butylene glycol (i.e. butane diol-1,4 or 1,3) and dipropylene glycol.

The polyester diols can be prepared using processes known in the art by reacting the aliphatic dibasic acid with a mixture of the stated glycols in the proportions given to obtain polyester diols having terminal hydroxyl groups and a molecular weight of about 800 to about 5,000, preferably from 1,000 to 3,000. Esterification techniques utilizing a vacuum and known catalysts such as inorganic acids can be used in the preparation of these polyester glycols.

As the soft segment of the polyurethane elastomers of the present invention, the polyester diols mentioned above are employed. But polyalkylene ether glycols having a molecular weight of about 800 to 5,000, preferably 800 to 2,500, such as polyethylene ether glycol, polypropylene ether glycol and polybutylene glycol (polytetramethylene ether glycol) may be employed as one component of the soft segment admixed with said polyester diols. As the content of the polyalkylene ethylene glycol is increased, resistance to cold of the polyurethane elastomer is also increased, but the wet coagulation properties are decreased. Therefore, the content of polyalkylene ether glycol is limited to at most about 50 weight per cent, preferably at most 40 weight per cent, based on the total weight of the mixture of polyester diol and polyalkylene glycol.

In the present invention, aromatic diisocyanates such as 4,4'-diphenyl methane diisocyanate, 3,3'-dimethyl diphenyl methane-4,4'-diisocyanate, 3,3'-dimethyl-4,4'-diphenylene diisocyanate, 1,5-naphthalene diisocyanate, 2,4- (or 2,6-) tolylene diisocyanate, and p-xylylene diisocyanate may be employed. Aliphatic diisocyanates such as ethylene diisocyanate, tetramethylene diisocyanate, and hexamethylene diisocyanate, may also be employed.

Of these diisocyanates, 4,4'-diphenyl methane diisocyanate is the most useful for purposes of the present invention. Accordingly, for purposes of convenience, 4,4'-diphenyl methane diisocyanate will be mainly employed in the following description of the present invention, abbreviated as "MDI."

For the chain extender to be utilized in the present invention, aliphatic glycols having a number of carbon atoms of less than five, such as butane diol-1,4, propane diol-1,3, and ethylene glycol, may be used. However, in view of its ready coagulation, ethylene glycol is especially preferred. If the number of carbon atoms contained in the chain extender exceeds the maximum value of four, good coagulation cannot result.

The polyurethane elastomers can be produced by controlling the NCO to OH ratio within the range of from about 0.9 to 1.2; and the amount of nitrogen contained in said polyurethane elastomers must be in the range of from about 3.5 to 5.0, preferably 3.7 to 4.5, which is calculated according to the following equation, wherein amounts of organic diisocyanate such as MDI, soft segment, and chain extender should be suitably prepared so as to react to afford nitrogen in the above mentioned range of percentages:

$$N(\%) = \frac{MDI\ (g)}{MDI\ (g) + \text{Soft Segment}\ (g) + \text{Chain Extender}\ (g)} \times \frac{28}{250} \times 100$$

If the percentage of nitrogen is less than 3.5, the polyurethanes will not readily coagulate; contrariwise, if it exceeds 5.0, the polyurethanes will exhibit good coagulation and will be imbued with poor mechanical properties when it is applied to produce a polyurethane sheet.

Gas or vapor permeable and water or liquid impermeable films having microporous structures can be produced by extruding the solution or emulsion of the polyurethane elastomers through slits or dies into a coagulating bath comprising a miscible nonsolvent for said elastomers, such as water, lower alcohols or mixtures of said nonsolvents and solvents, to form the films.

Gas or vapor permeable and water or liquid impermeable sheets having microporous structures can be produced by impregnating the solutions or emulsions of the polyurethane elastomers into fabrics, such as woven cloths, or nonwoven fabrics, and coagulating said impregnated elastomer in the coagulating bath described above to form the sheets.

Films or sheets, especially those having gas or vapor permeability and water impermeability are very useful materials as leather substitutes.

In order to further illustrate the present invention and the advantages thereof, the following specific examples are given, it being understood that same are intended merely as illustrative and in no wise limitative.

EXAMPLE 1

A polyester diol having a molecular weight of 2,740 and terminal hydroxyl groups was produced by the esterification reaction between glutaric acid and a mixed diol which consisted of dipropylene glycol and 2-ethyl hexane-1,3-diol in a molar ratio of 5:5.

One hundred and twenty-three grams of said polyester diol, 14.6 g of ethylene glycol (chain extender) and 75.8 g of 4,4'-diphenyl methane diisocyanate were charged into a 1-l three necked flask. Six hundred and thirty-eight grams of dimethylformamide were then added to said flask. The ingredients were allowed to react, under stirring for 8 hours, said flask being settled in an oil bath maintained at 80° – 85° C. The viscosity of the solution in the flask was markedly increased. Continuing said polymerization reaction for 2 more hours, the viscosity of the solution reached a constant value and no further increase in the viscosity was observed. The dimethylformamide solution of polyurethane elastomer thus obtained exhibited a viscosity of 380 poises at 30° C.

Said solution was diluted with dimethylformamide until a solution having a concentration of 20 weight percent polyurethane elastomer was realized. This solution was extruded from a slit into an aqueous dimethylformamide solution having a concentration of 50 weight percent dimethylformamide to produce a polyurethane elastomeric film.

The mechanical properties of the film are shown below.

| | |
|---|---|
| Tensile strength | 1.03 kg./mm.$^2$ |
| Elongation | 400% |
| Young's modulus | 1.32 kg./mm.$^2$ (at 20° C.) |

This film has sufficient properties for use as a leather substitute.

EXAMPLE 2

A polyester diol having a molecular weight of about 3,000 was produced by the esterification reaction between adipic acid and a mixed diol which consisted of dipropylene glycol and 2-ethyl hexane-1,3-diol in a molar ratio of 5:5.

Three hundred and forty grams of said polyester diol, 22.0 g of 4,4'-diphenylmethane diisocyanate and 4.02 g of ethylene glycol were dissolved in 198 g of dimethylformamide and polymerized at 85° C for 10 hours. A dimethylformamide solution of polyurethane elastomer having a viscosity of 450 poises at 30° C was obtained.

This solution was used to impregnate a nonwoven fabric having a cloth weight of 200 g/m$^2$ and a thickness of 0.5 cm, which fabric was composed of nylon-6 staple fibers having lengths of about 4.5 cm and 3.0 – 3.2 denier, and produced by the melt spinning of said polyamide tips at 50° C for 30 minutes. The fabric was dipped into a 50° C bath consisting of 50 weight percent dimethylformamide and the balance of water for 60 minutes to coagulate the impregnated elastomer. After coagulation, the sheet thus obtained was washed with water to remove any residual dimethylformamide in the sheet, and then the surfaces of said sheet were contacted with the surfaces of rolls heated at 150° C. Next said sheet was taken up on the roll. This sheet was useful as a leather substitute. The polyurethane elastomer of the present invention was readily coagulated and was able to provide a homogeneous microporous film.

EXAMPLE 3

A solution consisting of 20 weight percent polyurethane elastomer produced by the process of Example 2, 1.0 percent of sorbitan monostearate (a softener), 1.5 percent of stearyl alcohol (a softener) and 77.5 weight percent of dimethylformamide was used to impregnate a needle punched nonwoven fabric having a thickness of about 1.5 mm and composed of nylon staple fibers of 1.5 denier. The fabric was then dipped into a 60° C coagulating bath consisting of an aqueous solution of 40 weight percent dimethylformamide for 20 minutes to coagulate the impregnated elastomer. The sheet thus obtained was washed with water to remove any residual dimethylformamide and dried.

The sheet exhibited an appearance, feel, and fullness of a natural leather and was very soft.

EXAMPLE 4

One hundred and fifty grams of a polyester diol produced by the same process as described in Example 2 but with a molar ratio of dipropylene glycol to 2-ethyl hexane-1,3-diol of 6:4, 89.7 g of 4,4'-diphenylmethane diisocyanate, and 17.77 g of ethylene glycol were polymerized in 774 g of dimethylformamide at 80° C for 12 hours. A polyurethane elastomeric solution having a viscosity of 400 poises at 30° C was produced.

A solution consisting of 18 weight percent of the polyurethane elastomer prepared by the above process, 1.5 percent of sorbitan monostearate, 2.0 percent of stearyl alcohol and 78.5 weight percent of dimethylformamide was used to impregante a needle punched nonwoven fabric composed of 3 denier fibers spun from a mixed melt of 50 weight percent nylon and the remainder polystyrene. The fabric was then dipped in a 40° C mixed solution of 60 weight percent dimethylformamide and the balance methanol for 25 minutes to coagulate the impregnated elastomer. After coagulation, the sheet thus obtained was washed with water to remove any residual dimethylformamide and dried. The sheet was next dipped into toluene at 80° C to remove or leach the polystyrene from the sheet. The sheet thus obtained exhibited a fullness like natural leather and was supple.

No cracks were observed upon immersing said sheet in a 3 weight percent aqueous ammonia solution at 70° C for 20 days, but the converse was true as regards an immersion for only 6 days of a control sheet of polyurethane which was composed of a polybutylene adipate polyester diol.

EXAMPLE 5

A dimethylformamide solution of polyurethane elastomer having a viscosity of 390 poises at 30° C was obtained by the following reaction:

One hundred and thirty-five grams of a polyester diol having a molecular weight of 3,150, which was produced by the same process described in Example 2, 76.3 g of 4,4'-diphenylmethane diisocyanate, 13.7 g of ethylene glycol and 675 g of dimethylformamide (solvent) were mixed and polymerized at 75° C for 8 hours.

The solution thus obtained which consisted of 20 weight percent of polyurethane elastomer, 1 percent of carbon black, 0.5 percent of stearyl alcohol and 78.5 weight percent of dimethylformamide was coated on the surface of the sheet obtained by the process described in Example 3 in an amount of 800 g/m². The coated sheet was dipped for 25 minutes into a coagulation bath consisting of an aqueous solution of 45 percent dimethylformamide at 35° C to coagulate the coated elastomer, and then said sheet was washed with water and dried. The surface of the coated sheet was colored with a coloring agent and embossed with embossing rolls patterned as a natural leather. The leather substitute thus obtained exhibited an appearance, fullness and had the soft hand of a natural leather. Therefore, same was very useful as shoe uppers.

EXAMPLE 6

A dimethylformamide solution of polyurethane elastomer having a viscosity of 410 poises at 30° C was obtained by the following reaction:

One hundred grams of polyester diol having a molecular weight of about 2,000, which was produced by the same process described in Example 2 without the changing of the molar ratio from 5:5 to 4:6, 73.2 g of 4,4'-diphenylmethane diisocyanate, 20.6 g of butane diol-1,4 and 581 g of dimethylformamide (solvent) were mixed and polymerized at 70° C for 15 hours. The solution was then diluted with dimethylformamide to obtain a solution having 20 weight percent of polyurethane elastomer.

This solution was coated on the smooth surface of a polypropylene sheet having a thickness of 0.5 mm in an amount of 800 g/m². The coated sheet was next dipped for 15 minutes into a coagulating bath consisting of an aqueous solution of 50 weight percent dimethylformamide at 55° C. After coagulation, said sheet was washed with water and dried.

Next, a nonwoven fabric produced by needle punching webs of nylon fibers was dipped in a polyurethane elastomeric solution, which elastomer was synthesized from polybutylene adipate, 4,4'-diphenylmethane diisocyanate and ethylene glycol in dimethylformamide. Then, the fabric was dipped into an aqueous solution of dimethylformamide, as described above, to coagulate the impregnated elastomer. The thickness of the fabric was 1.3 mm.

The polyurethane elastomer surface of the polypropylene sheet was next adhered to the surface of the aforesaid fabric, and then the polypropylene sheet was peeled away from the polyurethane elastomeric layer of the laminate.

The laminate thus obtained exhibited an appearance, fullness and had the soft hand of a natural leather; it was useful as shoe uppers.

EXAMPLE 7

A polyurethane elastomeric solution having a viscosity of 280 poises at 30° C was formed by the reaction of 150 g of polyester diol, 89.7 g of 4,4'-diphenylmethane diisocyanate, 17.77 g of ethylene glycol, and 77.4 g of dimethylformamide, the polyester diol of which reactants having molecular weight of 3,000 and being formed by the reaction of the mixed diols ethylene glycol and 2-ethyl hexane-1,3-diol in the mole ratio of 5:5 and pimelic acid.

The reaction for preparing the dimethylformamide solution of polyurethane elastomer was carried out for 10 hours, under stirring, in a three-necked flask containing the above mentioned substances at a temperature of 75° C.

A 20 percent polyurethane solution was prepared by the addition of dimethylformamide into the polyurethane solution thus formed. With the use of this solution, a film was formed in a manner as to extrude and coagulate said solution into an aqueous solution of 50 percent dimethylformamide heated to 55° C.

The characteristics of the film thus formed were:

| Tensile strength | 0.79 kg./mm.² |
|---|---|
| Elongation | 360% |
| Young's modulus | 0.80 kg./mm.² | and this film can be utilized as a leather substitute.

EXAMPLE 8

40 g of polyethylene 2-ethyl-hexane-1,3-adipate having a molecular weight of 3,000, 22.0 g of 4,4'-diphenylmethane diisocyanate, and 4.02 g of ethylene glycol were polymerized in 198 g of dimethylformamide for 10 hours at 80° C to prepare a polyurethane elastomeric solution, said polyethylene 2-ethyl-1,3-hexane adipate being comprised of an ethylene glycol constituent and a 2-ethyl hexane-1,3-diol constituent in a mole ration of 6:4.

A nonwoven cloth, 0.5 cm in thickness and 200 g/m² in weight, comprising 3.0 to 3.2 denier staple fibers each 45 cm in length, formed by melt spinning tips of nylon-6, was impregnated for half an hour with the above polyurethane elastomeric solution heated to 50° C and then immersed for an hour in a bath comprising 50 parts of dimethylformamide and 50 parts of water maintained at 50° C, until the elastomer impregnating said cloth was coagulated.

The cloth charged with the coagulated elastomer was washed in water to remove dimethylformamide and fed through a suitable roller means in a manner as to contact for 10 minutes a roller heater heated to 150° C and thereby to prepare a leather substitute.

The polyurethane elastomer in this example showed a good coagulation sufficient to afford a stable and uniform film.

EXAMPLE 9

A needle punched nonwoven cloth, 1.5 mm in thickness, formed of 1.5 denier nylon staple was impregnated with a solution comprising 20 percent of the polyurethane synthesized in Example 8, 1.0 percent of sorbitan monostearate and 1.5 percent of stearyl alcohol (a softener), and 77.5 percent of dimethylformamide, and was immersed for 20 minutes in a 60° C coagulating bath comprising 40 percent of dimethylformamide and 60 percent of water until the elastomer was coagulated. Then the cloth was washed with water to remove any residual dimethylformamide and dried. To the sheet thus prepared there was imparted a leather-like appearance, feel, fullness and suppleness.

EXAMPLE 10

A polyurethane elastomeric solution having a viscosity of 450 poises at 30° C was formed by the reaction of 150 g of polyethylene 2-ethyl hexane-1,3 adipate having a molecular weight of about 3,000, 89.7 g of 4,4'-diphenylmethane diisocyanate, 17.77 g of ethylene glycol, and 774 g of dimethylformamide, the reaction being conducted at 80° C for 10 hours and said polyethylene 2-ethyl-1,3-hexane adipate containing an ethylene glycol constituent and a 2-ethyl hexane-1,3-diol constituent in the mole ratio of 3:7.

A needle punched nonwoven cloth comprising 3 denier fibers spun from a mixed melt of 50 percent of nylon and 50 percent of polystyrene was impregnated with a solution prepared from 18 percent of said polyurethane elastomer, 1.5 percent of sorbitan monostearate and 2.0 percent of stearyl alcohol (a softener), and 78.5 percent of diethylformamide and 40 percent of methanol maintained at 40° C until it was coagulated.

The cloth thus treated was washed in water to remove the residual diethylformamide. When said cloth was dried, it was immersed in a toluene solution in order to remove or leach out the polystyrene in the mixed spun fibers.

Thus, to the resultant sheet there was imparted a leather-like appearance and fullness, and same was very durable inasmuch as no cracks were observed therein even after 10 days of immersion in an aqueous solution containing 3 weight percent ammonia. On the contrary, a polyurethane elastomer produced by the same process described above but with the use of polybutylene adipate as the polyester diol cracked within 7 days.

EXAMPLE 11

135 g of polybutylene 2-ethyl hexane-1,3 adipate having a molecular weight of 3,150, which was formed by the reaction of the mixed diols, butane diol-1,4 and 2-ethyl hexane-diol-1,3 in the mole ratio of 5:5, and adipic acid, 76.3 g of 4,4'-diphenylmethane diisocyanate, 13.7 g of ethylene glycol, and 675 g of dimethylsulfoxide were mixed and polymerized for 9 hours at 75° C to give a dimethylsulfoxide solution of polyurethane elastomer having a viscosity of 350 poises at 30° C.

The base cloth prepared in Example 3 was coated with a solution comprising 19 percent of said polyurethane elastomer, 1 percent of carbon black, 0.5 percent of stearyl alcohol, and 79.5 percent of dimethylsulfoxide and then immersed for 25 minutes in a coagulating bath comprising 45 percent of dimethylsulfoxide and 55 percent of water, said bath being maintained at 35° C, until the elastomer was coagulated. After the base cloth was washed with water and dried, the surface layer of said base cloth was colored and embossed with an pattern similar to that of natural leather by means of a patterned roller.

To sheet material thus obtained there was imparted leather-like appearance, fullness, and suppleness, and same was useful as shoe uppers.

EXAMPLE 12

100 g of polyethylene 2-ethyl hexane-1,3 adipate having a molecular weight of 2,000, which was formed by the reaction of the mixed diols ethylene glycol and 2-ethyl hexane-diol-1,3 in the mole ratio of 5:5 and adipic acid, 73.2 g of 4,4'-diphenylmethane diisocyanate, 20.6 g of butane diol-1,4, and 581 g of dimethylformamide were mixed and reacted for 12 hours at 75° C to afford a solution having a viscosity of 320 poises at 30° C.

This solution was then diluted with dimethylformamide to afford a 20 percent solution, was flowed over a polypropylene sheet in an amount of 800 g/m², and said sheet was immersed for a quarter hour in a coagulating bath comprising 50 percent of dimethylformamide and 50 percent of water maintained at 55° C until the elastomer was coagulated. The sheet was then washed and dried.

The sheet thus prepared was next adhered to a porous base material of 1.3 mm in thickness obtained by wet-coagulating a needle punched nonwoven cloth of nylon fiber which was immersed in a polyurethane solution comprising polybutylene adipate, 4,4'-diphenylmethane diisocyanate, and ethylene glycol.

The finished article was thus imparted with a leather-like appearance, fullness, suppleness, and feeling, and therefore was able to be used as shoe uppers.

EXAMPLE 13

One hundred grams of a polyester diol which was produced by the same process described in Example 2, 100 g of polytetramethylene ether glycol having a molecular weight of about 1,000, 125 g of 4,4'-diphenylmethane diisocyanate and 22.0 g of ethylene glycol (the chain extender) were charged into a 2-l three-necked flask and admixed with 1,043 g of dimethylformamide, whereby the ingredients were dissolved. The dissolved ingredients were allowed to react at a temperature of 75° C for 10 hours with stirring. A polyurethane elastomeric solution exhibited a viscosity of 320 poises at 30° C.

Said solution was diluted with dimethylformamide until an 18 weight percent elastomeric solution was produced.

The solution thus obtained was extruded from a slit into a coagulation bath consisting of an aqueous solution of 50 weight percent dimethylformamide, at a temperature of 55° C, to coagulate said elastomer in the solution and to produce the film.

The mechanical properties of the film were shown as follows:

| | |
|---|---|
| Tensile strength | 0.92 kg./mm.² |
| Elongation | 350% |
| Young's modulus | 1.12 kg./mm.² (at 20° C.) |
| | 5.20 kg./mm.² (at −20° C.) |

This film had sufficient tensile strength and elongation to be used as a leather substitute, and the Young's modulus of said film at −20° C was desirably small. This reflects an increased resistance of the polyurethane elastomer to cold.

On the other hand, the values of Young's modulus at 20° C and at −20° C of a polyurethane elastomeric film which was produced by the same process but from polytetramethylene ether glycol as the polymeric diol were 1.03 kg/mm² and 10.8 kg/mm², respectively. The value at −20° C of the elastomer of the present invention is only about five times as great as that at 20° C. This evidences an enhanced resistance of the elastomer to cold.

EXAMPLE 14

A nonwoven fabric having a cloth weight of 200 g/m² and a thickness of 0.5 cm, consisting of nylon-6 (polycaprolactam) staple fibers having lengths of about 4.5 cm and 3.0 – 3.2 denier, was dipped into the polyurethane elastomeric solution produced by Example 13 at 50° C for 30 minutes. Said fabric was then squeezed and dipped into a 50° C coagulation bath consisting of 50 weight percent of dimethylformamide and the balance of water for 60 minutes to coagulate the polyurethane elastomer in the fabric. After coagulation, the sheet comprising said fabric was washed with water to remove the residual dimethylformamide in the sheet and the surfaces of which were then contacted with the surfaces of rolls heated to 140° C. Said sheet was next taken up on a roll. The sheet thus obtained was useful as a leather substitute. In this process, the elastomer of the present invention was easily coagulated and provided homogeneous microporous coagulated sheet instantly.

EXAMPLE 15

One hundred and thirty grams of a polyester diol having a molecular weight of about 2,000, prepared by the same process described in Example 10, 70 g of polytetramethylene ether glycol having a molecular weight of about 2,000, 124 g of 4,4'-diphenylmethane diisocyanate and 23.4 g of ethylene glycol (chain extender) were mixed and then allowed to react at 70° C for 10 hours in dimethylformamide. A polyurethane elastomeric solution in dimethylformamide was obtained and this solution exhibited a viscosity of 280 poises at 30° C.

A solution consisting of 20 weight per cent of said elastomer, 1.0 weight percent of sorbitan monostearate (a softener), 1.5 weight percent of stearyl alcohol (a softener) and 77.5 weight percent of dimethylformamide was employed to impregnate a nonwoven fabric having a thickness of 1.5 mm, which fabric was produced by needle punching webs of nylon-6 staple fibers of 1.5 denier. The impregnated fabric was dipped into a 55° C coagulation liquid consisting of an aqueous dimethylformamide solution having a concentration of 40 weight per cent, for 20 minutes, to coagulate the impregnated elastomer. After coagulation, the sheet was washed with water to remove the residual dimethylformamide and dried.

The sheet thus obtained had an appearance, feel, fullness and suppleness of a natural leather.

EXAMPLE 16

One hundred and fifty grams of a polyester diol which was the same as that used in Example 11, 50 g of polypropylene glycol, 144 g of 4,4'-diphenylmethane diisocyanate and 40.8 g of butane diol-1,4 (chain extender) were mixed and allowed to react at 75° C for 8 hours in 774 g of dimethylformamide.

A solution consisting of 18 weight percent of the elastomer, 1.5 percent of sorbitan monostearate, 2.0 percent of stearyl alcohol and 78.5 weight percent of dimethylformamide was employed to impregnate a nonwoven fabric which was produced by needle punching webs comprised of fibers spun from a mixed melt consisting of 50 weight percent of nylon-6 and the balance polystyrene. Said fabric was dipped into a coagulation bath consisting of 60 weight percent of diethylformamide and the balance of methanol to coagulate the impregnated elastomer. After coagulation, the sheet thus obtained was washed with water to remove the solvent and diethylformamide, and dried. Then, said sheet was dipped into toluene at 80° C to remove or leach out the polystyrene in the fibers of the sheet. The sheet thus obtained had a good fullness as in natural leather and was more soft and supple.

EXAMPLE 17

A solution consisting of 19 weight percent of the polyurethane elastomer produced by the process of Example 13, 1 percent of carbon black, 0.5 percent of stearyl alcohol and 79.5 weight percent of dimethylsulfoxide was coated onto the surface of a sheet which was produced by the process of Example 15, in an amount of 800 g/m². The sheet was next dipped into a 35° C coagulation bath consisting of 45 weight percent of dimethylsulfoxide and the balance of water for 25 minutes to coagulate the coated elastomer. After coagulation, said sheet was washed with water and dried. The surface of the coated sheet was then colored with a coloring agent and embossing with embossing rolls provided with a pattern similar to that of natural leather. The leather substitute thus obtained had the appearance, fullness and soft hand of a natural leather, and was useful as shoe upper.

EXAMPLE 18

A polyurethane elastomeric solution obtained by the process of Example 16 was coated onto the smooth surface of a polypropylene sheet having a thickness of 0.5 mm in an amount of 800 g/m². Said sheet was dipped into a 55° C aqueous dimethylformamide solution having 50 weight percent of dimethylformamide for 15 minutes to coagulate the coated polyurethane elastomer. After coagulation, said sheet was washed with water and dried.

Next, a nonwoven fabric produced by needle punching webs of nylon fibers was dipped in a polyurethane elastomeric solution, which elastomer was synthesized from polybutylene adipate, 4,4'-diphenylmethane diisocyanate and ethylene glycol. The fabric was dipped into an aqueous solution of dimethylformamide, as described above, to coagulate the impregnated elastomer.

The polyurethane elastomer surface of the polypropylene sheet was next adhered to the surface of the aforesaid fabric, which had a thickness of 1.3 mm, and then the polypropylene sheet was peeled away from the laminate. The sheet thus obtained exhibited the appearance, fullness and soft hand of a natural leather; therefore, it was useful as shoe uppers.

EXAMPLE 19

For purposes of comparison, polyurethane elastomers were prepared from polymeric diols numbered from one to 14 in the following TABLE 1, 4,4'-diphenylmethane diisocyanate and ethylene glycol (the chain extender) with the ratio of NCO:OH being about 1:1 and the nitrogen content in the

TABLE 1

| Number | Polyurethane elastomer produced from the following polymeric diols | Resistance to hydrolyzing agents (unit: day) | | |
|---|---|---|---|---|
| | | Aqueous lactic acid solution (100 g./l.) | Aqueous NaOH solution (0.1 wt. percent) | Aqueous ammonia (3 wt. percent) |
| 1 | Polyethylene 2-ethyl hexane-1,3 adipate (the molar ratio of ethylene/2-ethyl hexane-1,3=5/5) | 8-10 | 4-5 | 10-12 |
| 2 | Polyethylene 2-ethyl hexane-1,3 adipate (the molar ratio of ethylene/2-ethyl hexane-1,3=5/7) | 14-16 | 6-9 | 14-16 |
| 3 | Polybutane-1,4-2-ethyl hexane-1,3 adipate (the molar ratio of butane-1,4/2-ethyl hexane-1,3=5/5) | 10-12 | 7-8 | 14-16 |
| 4 | Polybutane-1,4-2-ethyl hexane-1,3 adipate (the molar ratio of butane-1,4/2-ethyl hexane-1,3=4/6) | 12-14 | 7-8 | 14-16 |
| 5 | Polydipropylene 2-ethyl hexane-1,3 adipate (the molar ratio of dipropylene/2-ethyl hexane-1,3=5/5) | 10-12 | 9-13 | <12 |
| 6 | Polydipropylene 2-ethyl hexane-1,3 adipate (the molar ratio of dipropylene/2-ethyl hexane-1,3=4/6) | 11-13 | <13 | <12 |
| 7 | Polydipropylene 2-ethyl hexane-1,3 adipate (the molar ratio of dipropylene/2-ethyl hexane-1,3=6/4) | 10-12 | 9-13 | <12 |
| 8 | The mixture of 30 wt. percent of polytetramethylene ether glycol (MW=1500) and 70 wt. percent of polyethylene 2-ethyl hexane-1, 3 adipate (MW=3000) (molar ratio of ethylene/2-ethyl hexane-1,3=4/6). | 17-19 | 18-20 | 18-20 |
| 9 | The mixture of 35 wt. percent of polypropylene glycol (MW=1000) and 65 wt. percent of polydipropylene 2-ethyl hexane-1,3 adipate (MW=3000, molar ratio of dipropylene/2-ethyl hexane-1,3=5/5). | 15-17 | 17-18 | 17-18 |
| 10 | Polyhexane-1,6 adipate (MW=3000) | 4-6 | 9-13 | 12-14 |
| 11 | Polyhexane-1,6 neopentyl adipate (MW=3000, molar ratio of hexane-1,6/neopentyl=7/3) | 6-8 | 7-9 | <12 |
| 12 | Polycaprolactone (MW=2000) | 4-6 | 4-5 | 10-12 |
| 13 | Polybutylene adipate (MW=3000) | 3-5 | 2-4 | 9-12 |
| 14 | Polyethylene propylene adipate (MW=2000, molar ratio of ethylene/propylene=9/1) | 1-2 | >1 | 1 | elastomers, which is calculated via the equation described above, being fixed at 4.0.

These elastomers were dissolved in dimethylformamide and solutions having a content of about 20 weight percent were formulated.

These solutions were then extruded through a slit into an aqueous solution of 50 weight per cent dimethylformamide to coagulate said elastomers and to produce films.

For a comparison test as to resistance to hydrolysis, films were dipped into a hydrolyzing agent, i.e., an aqueous solution of lactic acid having the concentration of 100 g/l, a 0.1 weight percent aqueous caustic soda solution and a 3 weight percent aqueous ammonia solution, said solution being maintained at 70° C.

The results obtained are set forth in Table 1.

In said Table 1, the samples Nos. 1 to 9 represent films comprised of the polyurethane elastomers of the present invention, and the samples Nos. 10 to 14 represent films comprised of well-known prior art polyurethane elastomers.

The values set forth in the column, "Resistance to hydrolyzing agents (unit: days)" in Table 1 reflects the days elapsed until cracks appear on the surface of each film.

Therefore, the greater the value, the greater the resistance to hydrolysis of the respective elastomers.

From the above table, the following results may be observed: Polyurethane elastomer produced from polyethylene propylene adipate (sample No. 14), which is used for the preparation of film in U.S. Pat. No. 3,348,963, exhibits poor resistance to all hydrolyzing agents.

Polyurethane elastomers produced from polyhexane-1,6 neopentyl adipate, which is described in British Pat. No. 975,303, exhibits excellent resistance to an aqueous ammonia solution and moderate resistance to an aqueous lactic acid solution. But it is difficult to produce a film having smooth surfaces and a homogeneous microporous structure from this elastomer.

On the other hand, all polyurethane elastomers produced from the polymeric diols of samples Nos. 1 to 9 exhibit excellent resistance to all of the hydrolyzing agents.

Since the invention is capable of considerable modification and variation from the details given above, any change which conforms to the spirit of the invention is intended to be included in the scope of the appended claims.

What is claimed is:

1. In a polyurethane composition which is wet coagulable to form a microporous sheet having a smooth surface and resistance to hydrolysis by human perspiration, which comprises the reaction product of a polymeric diol having a molecular weight of from about 800 to about 5,000, an organic diisocyanate and a chain extender selected from the group consisting of aliphatic diols having two to four carbon atoms, the improvement comprising (a) the polymeric diol is a polyester diol and is the reaction product of an aliphatic dicarboxylic acid and mixed diols comprising from 20 to 80 mol percent of 2-ethyl hexane-1,3-diol and from about 80 to 20 mol percent of a diol selected from the group consisting of ethylene glycol, propylene glycol, dipropylene glycol, and butylene glycol, (b) the organic diisocyanate is 4,4'-diphenyl methane diisocyanate, and (c) the nitrogen content is said polyurethane elastomer is in the range of from about 3.5 to 5.0 weight percent.

2. The polyurethane elastomer according to claim 1 wherein said polyester diol is the reaction product of adipic acid and mixed diols comprising from 20 to 80 mol percent of 2-ethyl hexane-1,3-diol and from 80 to 20 mol percent of dipropylene glycol.

3. The polyurethane elastomer according to claim 1 wherein said polyester diol is the reaction product of adipic acid and mixed diols comprising from 20 to 80 mol percent of 2-ethyl hexane-1,3-diol and from 80 to 20 mol percent of ethylene glycol.

4. The polyurethane elastomer according to claim 1 wherein said polyester diol is the reaction product of adipic acid and mixed diols comprising from 20 to 80 mol percent of 2-ethyl hexane-1,3-diol and from 80 to 20 mol percent of butylene glycol.

5. The polyurethane elastomer according to claim 1 wherein said polyester diol is a reaction product of adipic acid and mixed diols comprising 20 to 80 mol percent of 2-ethyl hexane-1,3-diol and 80 to 20 percent of propylene glycol.

6. The polyurethane elastomer according to claim 1, wherein said chain extender is ethylene glycol.

7. The polyurethane elastomer according to claim 1, wherein the aliphatic dicarboxylic acid is selected from the group consisting of glutaric, adipic, pimelic, suberic, azelaic and sebacic acids.

8. A substrate coated or impregnated with the polyurethane elastomer as defined by claim 1.

9. A leather substitute comprised of the polyurethane elastomer as defined by claim 1.

10. In a polyurethane composition which is wet coagulable to form a microporous sheet having a smooth surface and resistance to hydrolysis by human perspiration, which comprises the reaction product of a polymeric diol having a molecular weight of from about 800 to 5,000, an organic diisocyanate and a chain extender selected from the group consisting of aliphatic diols having from two to four carbon atoms, the improvement comprising (a) the polymeric diol comprises an admixture of (i) from 50 to 100 weight percent of a polyester diol which is the reaction product of an aliphatic dicarboxylic acid and mixed diols comprising from 20 to 80 mol percent of 2-ethyl hexane-1,3-diol and from 80 to 20 mol percent of a diol selected from the group consisting of ethylene glycol, propylene glycol, dipropylene glycol, and butylene glycol, and (ii) from 50 to 0 weight percent of a polyalkylene ether glycol, (b) the organic diisocyanate is 4,4'-diphenylmethane diisocyanate and (c) the nitrogen content in said polyurethane elastomer is in the range from about 3.5 to 5.0 weight percent.

11. The polyurethane elastomer according to claim 10, wherein said polyalkylene ether glycol is polytetramethylene ether glycol.

12. The polyurethane elastomer according to claim 10, wherein said polyalkylene ether glycol is polypropylene ether glycol.

* * * * *